(12) United States Patent
Halford

(10) Patent No.: US 10,081,121 B2
(45) Date of Patent: Sep. 25, 2018

(54) MOULD TOOL HEAT TRANSITION MANAGEMENT

(71) Applicant: SURFACE GENERATION LIMITED, Rutland (GB)

(72) Inventor: Ben Halford, Rutland (GB)

(73) Assignee: SURFACE GENERATION LIMITED, Rutland (GB)

( * ) Notice: Subject to any disclaimer, the term of this patent is extended or adjusted under 35 U.S.C. 154(b) by 89 days.

(21) Appl. No.: 14/772,747

(22) PCT Filed: Apr. 24, 2014

(86) PCT No.: PCT/GB2014/051271
§ 371 (c)(1),
(2) Date: Sep. 3, 2015

(87) PCT Pub. No.: WO2014/174292
PCT Pub. Date: Oct. 30, 2014

(65) Prior Publication Data
US 2016/0031122 A1 Feb. 4, 2016

(30) Foreign Application Priority Data
Apr. 25, 2013 (GB) ..................... 1307436

(51) Int. Cl.
*B29C 33/04* (2006.01)
*B29C 35/02* (2006.01)
*B29C 35/16* (2006.01)

(52) U.S. Cl.
CPC .......... *B29C 33/04* (2013.01); *B29C 35/0294* (2013.01); *B29C 35/16* (2013.01); *B29C 2033/042* (2013.01); *B29C 2035/1616* (2013.01)

(58) Field of Classification Search
USPC ....................................................... 264/327
See application file for complete search history.

(56) References Cited

U.S. PATENT DOCUMENTS 3,763,293 A * 10/1973 Nussbaum .............. B29C 33/04
264/327
4,217,325 A * 8/1980 Colby ..................... B29C 33/04
264/245

(Continued)

FOREIGN PATENT DOCUMENTS

EP 0953426 A2 11/1999
WO 2009084762 A1 7/2009

(Continued)

OTHER PUBLICATIONS

International Search Report in PCT/GB2014/051271 dated Oct. 9, 2014.

(Continued)

*Primary Examiner* — Jacob T Minskey
*Assistant Examiner* — Baileigh K Darnell
(74) *Attorney, Agent, or Firm* — Young Law Firm, P.C.

(57) ABSTRACT

A tool system for molding an article comprising a tool (100) having a tool surface (110) for forming an article, the tool surface (110) comprising a plurality of tool zones, a plurality of fluid flow paths (151, 152) to direct the flow of a heating or a cooling fluid to individual tool zones, heating means comprising an in-line heater (150) for heating fluid passing through a respective heating fluid flow path and cooling means comprising a cooling fluid flow path, the cooling fluid flow path bypassing the in-line heater of the heating fluid flow path.

17 Claims, 7 Drawing Sheets

(56) References Cited

U.S. PATENT DOCUMENTS

| | | | |
|---|---|---|---|
| 4,963,312 A | 10/1990 | Mueller | |
| 5,445,510 A | 8/1995 | Jackson, Jr. | |
| 2007/0075457 A1* | 4/2007 | Eichlseder | B29C 33/04 |
| | | | 264/328.14 |
| 2010/0003359 A1 | 1/2010 | Shimoda et al. | |
| 2011/0045120 A1 | 2/2011 | Higashi et al. | |
| 2011/0101565 A1 | 5/2011 | Cho | |
| 2012/0267828 A1 | 10/2012 | Halford | |
| 2012/0280415 A1 | 11/2012 | Halford | |
| 2012/0315351 A1* | 12/2012 | Oh | B29C 45/73 |
| | | | 425/552 |

FOREIGN PATENT DOCUMENTS

| | | | | |
|---|---|---|---|---|
| WO | WO 2011048365 A1 * | 4/2011 | | B29C 35/0288 |
| WO | 2013021195 A2 | 2/2013 | | |

OTHER PUBLICATIONS

Patents Act 1977: Search Report under Section 17(5) dated Oct. 18, 2013 in UK application GB1307436.4.

* cited by examiner

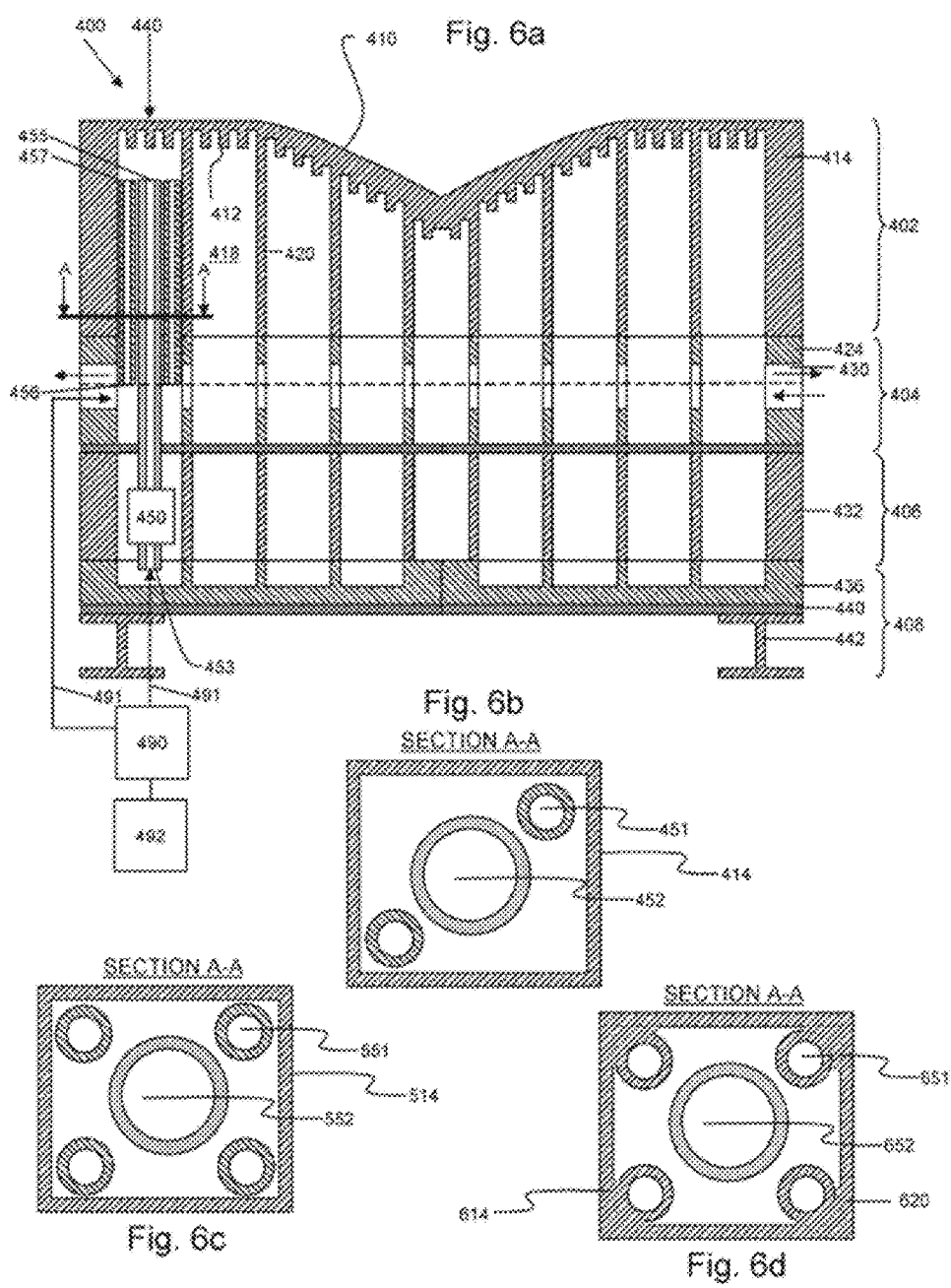

MOULD TOOL HEAT TRANSITION MANAGEMENT

BACKGROUND

The present invention is concerned with the management of temperature of a mould tool. More specifically the present invention is concerned with active power and flow management of the temperature of a mould tool which utilises fluid heating and cooling.

BRIEF DESCRIPTION OF THE DRAWINGS

FIG. 3b is a detail view of region B of FIG. 3a;

FIG. 3c is a detail view of region B of FIG. 3a with the mould tool heat management system in an alternate configuration;

FIG. 6a is a schematic view of a fourth embodiment of a mould tool heat management system in accordance with the present invention;

FIG. 6b is a partial section view of the mould tool heat management system of FIG. 6 taken at line A-A;

FIG. 6c is a partial section view of an alternate configuration of the mould tool heat management system of FIG. 6 taken at line A-A;

FIG. 6d is a partial section view of an alternate configuration of the mould tool heat management system of FIG. 6 taken at line A-A;

DETAILED DESCRIPTION

Fluid heating of mould tools is known, in particular from the applicant's earlier application published as WO 2011/048365. In this document, fluid-based heating and cooling means independently associated with individual zones of a mould tool is discussed, whilst a control means is adapted to control the heating and cooling means to individually heat or cool the tool zones in order to regulate heat transfer into and out of an article to be moulded at each tool zone at any particular time throughout the moulding process.

Such mould tools may typically be employed for two different uses.

A first type of mould tool use is that of high volume continuous production, which may be characterised by short thermal cycle times per workpiece, with each new workpiece moulded soon after the previous workpiece has been moulded. In this way the mould tool is in continuous use throughout the production shift.

A second type of mould tool use is that of low volume intermittent production, which may be characterised by longer thermal cycle times per workpiece, with the mould tool undergoing a "down time" period, between moulding of workpieces. This may be due to complex installation/removal processes of the workpiece on/from the mould tool, for example, due to the requirement for ancillary equipment.

Both these types of mould tool use present challenges to the mould tool user.

Figure 1:
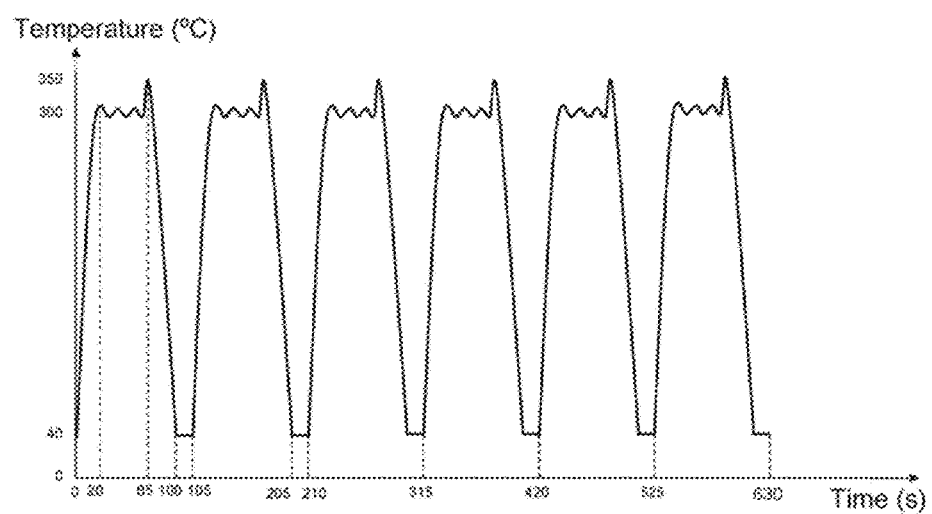
FIG. 1 is a temperature profile of a known layered mould tool used for high volume continuous production.

FIG. 1 is a temperature cycle of a known mould tool (such as that disclosed in WO 2013/021195), used for high volume continuous production. A heating and cooling flow is passed through an in-line air heater. When cooling, the heater is switched off. Each workpiece is heated and cooled rapidly using this method.

When switching from heating to cooling the residual heat within an in-line heater and surrounding components may take a significant amount of time, relative to the overall workpiece cycle time, to be transferred away, such that flow through the in-line heater is no longer heating.

Additionally, when switching from cooling to heating, the in-line heater and surrounding mould tool structure may take a significant amount of time, relative to the overall workpiece cycle time, to heat up sufficiently such that the fluid exhausted by the in-line heater is at the desired temperature.

During these transition phases, the in-line heater is effectively propelling fluid at the wrong temperature, having a deleterious effect.

FIG. 2 is a temperature cycle of a known mould tool (such as that disclosed in WO 2013/021195), used for low volume intermittent production. Each workpiece is heated and cooled over a longer period of time with respect to the temperature cycle of a mould tool used for high volume continuous production.

A key noticeable difference between the two is the longer "down time" between removal of a first workpiece after treatment and the beginning of the treatment of the next workpiece. This is shown at times 20 to 25 min and 45 to 50 min. During this "down-time" the mould tool loses residual heat, requiring a greater ramp up when the mould tool is put in the following cycle, requiring more thermal energy and exacerbating the length of the "down-time" period.

Another challenge particularly relevant to mould tools with short duration cycle times and inherent with the use of in-line heaters relates to maximum fluid flow rates. Fluid heating and cooling rates tend to differ, in that lower fluid flow rates are required for heating a mould tool, as compared with the fluid flow rates required for cooling the same mould tool. A ratio of three to one (3:1), when comparing cooling fluid flow rate to heating fluid flow rate is typical for known layered mould tools such as that disclosed in WO 2013/021195. Achieving fluid flows with optimal flow characteristics, (such as levels of turbulence) for cooling can be problematic on small scale mould tools, where the heating componentry of the in-line heater acts as a obstacle in the conduit responsible for delivering the cooling fluid.

Furthermore, the combined effect of residual heat in the in-line heater when transitioning from heating to cooling and the necessary increase in fluid flow when making the same transition, results in a high temperature "spike" which may have a deleterious effect on both the mould tool and the workpiece.

It is an aim of the present invention is to increase the thermal agility of a mould tool to allow greater control of the mould face and reduce both cycle times for producing parts and overall tool efficiency.

According to a first aspect of the invention there is provided a tool system for moulding an article, the system comprising a tool having a tool surface for forming an article, the tool surface comprising a plurality of tool zones, a plurality of fluid flow paths to direct the flow of a heating or a cooling fluid to individual tool zones, heating and cooling means; the heating means comprising an in-line heater for heating fluid passing through a respective heating fluid flow path, the heaters being independently associated with the heating flow path of at least some of said tool zones, the cooling means comprising a cooling fluid flow path, the cooling fluid flow path bypassing the in-line heater of the heating fluid flow path.

By providing alternate fluid flow paths for heating and cooling flows the two different pathways may be optimised for the functions of heating and cooling. By providing alternate fluid flow pathways in the region of the in-line heater it is not necessary to route cooling fluid flow through the in-line heater of the heating fluid flow pathway. Advantageously the in-line heater does therefore not act as an obstacle to the cooling fluid flow. Furthermore, when switching between heating and cooling, unwanted residual heat in the in-line heater is not delivered to the tool surface as would be the case if the cooling fluid flow were routed through the in-line heater, therefore there is no heat stripping spike following the transition. Furthermore still, the in-line heater may be set at a particular temperature whilst cooling fluid is passing via the cooling fluid pathway, such that when the tool is transitioned from cooling to heating, the inline heater is at the requisite temperature immediately.

In a preferred embodiment the cooling fluid flow path is wholly alternate to the heating flow path. This arrangement allows specific tailoring of the heating fluid flow pathway and the cooling fluid flow pathway, for example providing a greater cross-sectional area for the cooling fluid flow pathway to accommodate the large fluid flow rates associated with cooling fluid flow relative to heating fluid flow. Furthermore, capacitive effects of the conduits of the heating fluid flow pathway and the cooling fluid flow pathway do not adversely affect (the other of) heating and cooling of the mould tool, which could otherwise be detrimental in the short cycle times of high volume production. This arrangement further allows the fluid flow through the in-line heater to be run in reverse whilst cooling the individual tool zones with the cooling fluid flow, advantageously stripping heat from the individual tool zones.

The heating and cooling fluid flow paths may be isolated from one another. This arrangement allows greater thermal isolation of the two types of fluid pathways.

In a preferred embodiment of the invention the tool system for moulding an article may have a temperature control surface opposite the tool surface to define a mould layer, the temperature control surface at least partially bounding a fluid chamber, the fluid chamber having an exhaust, and a further layer supporting the mould layer in use, the heating and cooling means being arranged between the further layer and the mould layer.

The heating and cooling fluid flow paths may comprise a conduit with its inlet located in the further layer and its outlet located in the fluid chamber.

In a preferred embodiment the tool may further comprise an intermediate layer, the intermediate layer positioned between the mould layer and the further layer.

The heating fluid flow path may be defined by a conduit with its inlet located in the further layer and its outlet located in the fluid chamber, and the cooling fluid flow path may be defined by a conduit with its inlet located in the intermediate layer and its outlet located in the fluid chamber. The intermediate layer may therefore act as a cold fluid reservoir which can be employed to reduce the temperature of the fluid chamber (and therefore the tool surface) rapidly.

In a preferred embodiment the intermediate layer may be in fluid communication with refrigeration means. This further supports the intermediate layer's role as a cold fluid reservoir.

In an alternate embodiment the cooling fluid flow path and heating fluid flow path may share a common conduit save for a portion adjacent the in-line heater, wherein the cooling fluid flow path defines an in-line heater bypass. This provides a spatially efficient arrangement within the mould tool.

In another preferred embodiment the cooling fluid flow path and heating fluid flow path may share a common conduit upstream of the in-line heater only. In another preferred embodiment the cooling fluid flow path and heating fluid flow path may share a common conduit downstream of the in-line heater only. These arrangements allow for more efficient use of materials and design of the structural layout of the tool.

The cooling fluid flow path may be concentrically arranged about the heating fluid flow path. This provides a spatially efficient arrangement and allows for common support structure for the two types of pathways.

In a preferred embodiment the tool may further comprise control means adapted to control the heating and cooling means.

The control means may be configured to individually heat or cool the tool zones by selectively directing fluid flow via the heating and/or cooling fluid flow paths.

The selection may be passive, by using valves responsive to fluid flow rates, with cooling fluid flow tending to comprise of greater fluid flow rates relative to heating fluid flow.

According to a second aspect of the present invention there is provided a method of manufacturing an article comprising the steps of providing a tool system for moulding an article, the system comprising a tool having a tool surface for forming an article, the tool surface comprising a plurality of tool zones, a plurality of fluid flow paths to direct the flow of a heating or a cooling fluid to individual tool zones, heating and cooling means; the heating means comprising an in-line heater for heating fluid passing through a respective heating fluid flow path, the heaters being independently associated with the heating flow path of at least some of said tool zones, the cooling means comprising a cooling fluid flow path, the cooling fluid flow path bypassing the in-line heater of the heating fluid flow path; placing an article to be moulded on the tool surface; heating the article by activating the heating means to vary the tool surface temperature of each tool zone; and cooling the article by activating the cooling means to vary the tool surface temperature of each tool zone.

In a preferred embodiment the method may comprise the further step of actively controlling the heating and cooling means to regulate the heat transfer into and out of the article at each tool zone at any particular time throughout the moulding process by selectively directing fluid flow via the heating and/or cooling fluid flow paths.

In a preferred embodiment, during the step of selectively directing fluid flow via the heating flow path, actively controlling the in-line heaters to change the fluid from a cooling fluid to a heating fluid.

In a preferred embodiment the method may comprise the further step of activating the heater assembly and heating fluid flow before the step of placing the article to be moulded on the tool surface. Advantageously this allows the mould tool to be preheated.

In a preferred embodiment the method may comprise the further step of maintaining the heater assembly and heating fluid flow active during the step of activating the cooling means, such that the heater assembly is pre-heated ready for a subsequent transition from cooling fluid flow to heating fluid flow. Hot starting of the in-line heater reduces cycle time.

In a preferred embodiment the method may comprise the further step of maintaining the heater assembly and heating fluid flow active at a reduced level during the step of activating the cooling means, such that the heater assembly is pre-heated ready for a subsequent transition from cooling fluid flow to heating fluid flow. Given the higher fluid flow rates associated with cooling flow relative to heating flow, for relatively short periods of heating and cooling, it may be sufficient to "turn on" the cooling fluid flow without "turning off the heating fluid flow.

In a preferred embodiment the method may comprise the further step of reversing the fluid flow through the in-line air heater when transitioning between the steps of heating the article and cooling the article. A temporary "pull back" of hot fluid through the heating fluid flow pathway helps to accelerate cooling of the tool surface, whilst maintaining a flow through the heater, to avoid "burn out".

Figure 3A:
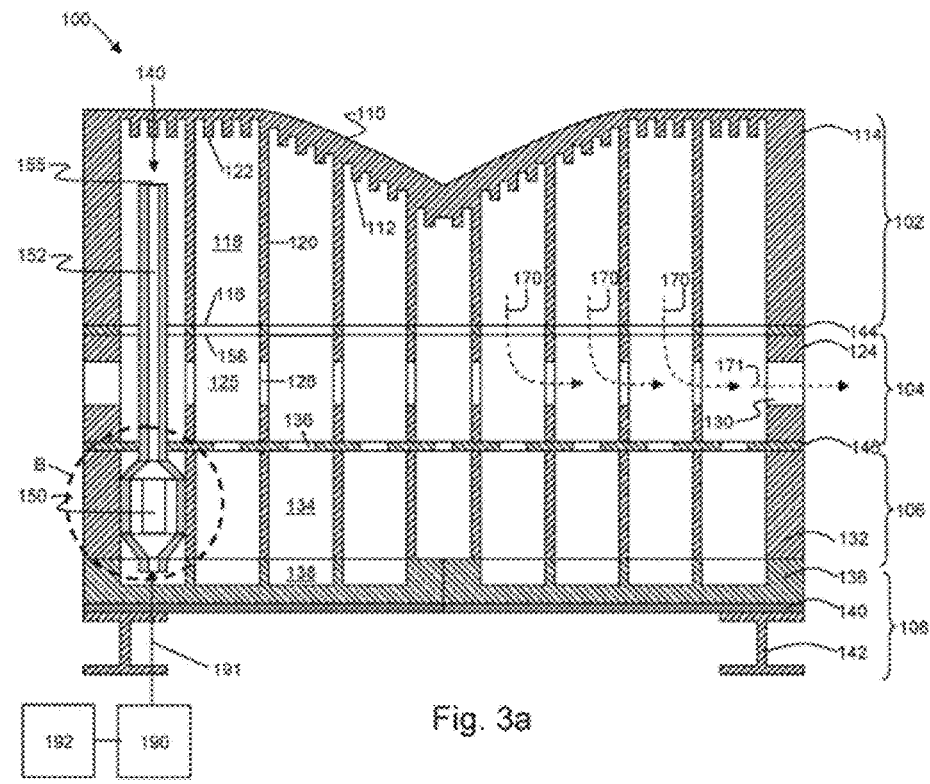
FIG. 3a is a schematic view of a first embodiment of a mould tool heat management system in accordance with the present invention.

Referring to FIG. 3a, a tool 100 comprises a first layer 102, a second layer 104, a third layer 106 and a support assembly 108.

The first layer 102 comprises a tool face 110. The tool face 110 defines the shape of a workpiece to be formed, and in use is associated with an opposing tool (not shown). On the underside of the tool face 110, a temperature control surface 112 is defined as will be described below.

The first layer 102 is surrounded by a peripheral wall 114 so as to define an enclosed volume. The first layer 102 defines a number of discrete chambers 118 which are bound by a part of the temperature control surface 112 at a first end and open at a second end 116. The chambers 118 are separated by chamber walls 120 which extend from the temperature control surface 112 to the open ends 116. As such, the first layer 102 defines a type of honeycomb structure comprising a number of discrete cell-like chambers 118.

The temperature control surface comprises a number of ribs 122. The ribs provide a large surface area of the temperature control surface for the fluid within the chamber 118 to contact and thereby encourage heat transfer between the fluid and the temperature control surface 112. As such, any fluid instant in the chamber 118 will influence the temperature of the tool face 110 by conduction through the first layer 102.

The second layer 104 comprises a block 124 having a number of through bores 125 defined therein. Adjacent through bores 125 are in fluid communication via internal ports 128. The through bores proximate the periphery of the block 124 define exhaust ports 130 in fluid communication with the through bores 125.

The third layer 106 comprises a block 132 having a series of through bores 134. Each of the through bores 134 contains mounting apparatus for an in-line air heater (as will be described below).

The support assembly 108 comprises a sealing plate 136 having a plurality of blind bores 138 defined therein, a support plate 140 and a plurality of I-beams 142.

In addition to the above mentioned components a first gasket 144 and a second gasket 146 are provided.

The tool 100 is assembled as follows.

Figure 3B:
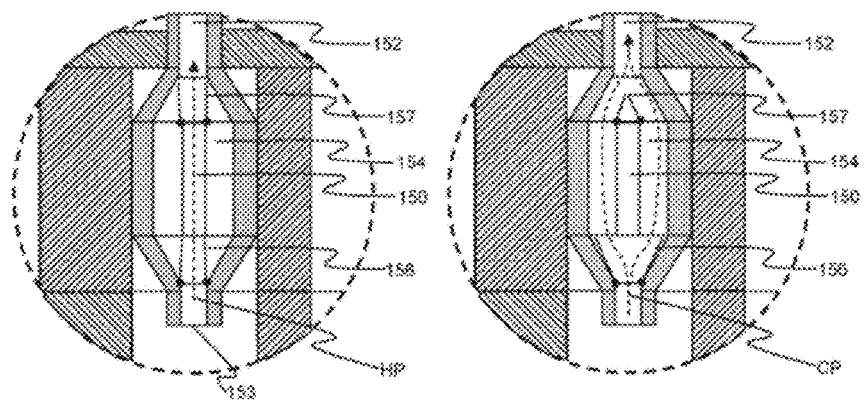

The I-beams 142 form a reaction structure for the tool such that any compressive loads imparted by the opposing tool (not shown) upon the tool face 110 can be reacted. The support plate 140 is mounted on I-beams 142 and the sealing plate 136 is positioned on top of the support plate 140 as shown in FIG. 3 a. The third layer 106 is then mounted to the support plate such that each of the through bores 134 aligns with a respective blind bore 138 of the seal plate.

An in-line air heater 140 is provided having heater assembly 150, and elongate tube section 152, inlet 153, outlet 155 and bypass portion 154. The heater assembly 150 is mounted within the third layer 106 with a through bore 134. Upstream heater assembly valve 156 and downstream heater assembly valve 157 are posited upstream and downstream respectively of the heater assembly 150. Upstream heater assembly valve therefore controls flow through the heater assembly 150 and bypass 154. It will be noted that a plurality of such heaters are installed into each of the through bores 134. Upwardly projecting thermocouples will also be installed.

The second gasket is placed on top of the third layer 106. The second gasket 146 comprises a plurality of orifices 136 which form a tight seal around the tube section 152 of the heater 150. As such, when each of the heaters 150 is installed along with the gasket 146, each of the bores 134 is sealed by virtue of the seal plate 136 beneath and the gasket 146 above.

The second layer 104 is then placed on top of the third layer 106 such that each of the through bores 125 is aligned with a respective through bore 134. As such, each of the through bores 125 has part of an air heater tube section 125 contained therein.

The first gasket 144 is placed on top of the second layer 104. The first gasket 144 comprises a series of orifices 158 which are substantially wider than the sections 152 of the heaters 140 such that the through bores 125 are upwardly open.

The first layer 102 is stacked onto the second layer 104 such that each of the chambers 118 is aligned with a respective through bore 125. As such, the through bores 125 and the chambers 118 are each in fluid communication with each other.

As will be seen in FIG. 3, when assembled the outlet 155 of the tube section 152 ejects fluid proximate to, and impinges on, the temperature control surface 112 of the first layer 102.

Each of the gaskets 144, 146 is constructed from a thermally insulating material. The material has a thermal conductivity lower than the material used to construct the layers 102, 104. As such, conduction between the first layer 102 and the second layer 104 is minimised.

Similarly, conduction between the second layer 104 and the third layer 106 is minimised due to the second gasket 146. In addition, because the orifices 136 form a tight seal around the tube sections 152 of the heaters 140, no passage of fluid between the through bore 125 and through bores 134 is permitted. As such, heat transfer by way of conduction and convection is not permitted between the second layer 104 and the third layer 106.

Assembled, each in-line air heater 140 provides a heating fluid flow pathway, comprising heater assembly 150, elongate tube section 152, inlet 153 and outlet 155 and a cooling fluid flow pathway, comprising bypass portion 154, elongate tube section 152, inlet 153 and outlet 155. The bypass portion 154 is concentrically arranged around the heater assembly 150 of the in-line air heater 140. As such the heating fluid flow pathway and the cooling fluid flow pathway share a common conduit except in the region of the heater assembly 150. The inlet 153 of the heating and cooling fluid flow pathways is supplied (arrow 191) by compressed air source 190, controlled by a multi-channel master controller 192, which receives feedback from the tool body 112 via a series of temperature control sensors (not shown).

The tool 100 in use, may therefore be operated in a variety of ways.

When heating of a workpiece is required (see FIG. 3b), the heater assembly 150 is activated and pressurised fluid is urged through the inlet 153 of in-line air heater 140. Both upstream heater assembly valve 156 and downstream heater assembly valve are in a first position such that the pressurised fluid is urged through the heater assembly 150, via the heating fluid flow path, to heat the fluid. The heated fluid flows up the elongate tube section 152, and exits the in-line air heater 140 at outlet 155 to impinge upon the rib 122 of the temperature control surface 112. Following impingement of the heated fluid on to the temperature control surface 112 of the first layer 102, the heated fluid passes from each chamber 118 of the first layer 102 to the chambers 125 of the second layer 104 via the open ends 116 as shown by dashed arrow 170. The fluid then passes along the second layer 104, under pressure, through the internal ports 128, gradually mixing in the process. The fluid then exits the second layer 104 via exhaust port 130 as shown by dashed arrow 171, exhausting to the surrounding atmosphere.

When cooling of a workpiece is required, the flow of pressurised fluid takes the alternate cooling fluid flow path (see FIG. 3c), as upstream heater assembly valve 156 is moved to a second position, allowing the fluid to flow via the in-line heater bypass 154, the downstream heater assembly valve 157 also being moved to a second position, allowing the fluid to flow up the elongate tube section 152 and substantially preventing flow through the heater assembly 150. The cooling fluid then exits the in-line air heater 140 at outlet 155 to impinge upon the rib 122 of the temperature control surface 112. Following impingement of the cooling fluid on the temperature control surface 112 of the first layer 102, the cooling fluid follows the same path and the heated fluid, i.e. eventually exhausting to the surrounding atmosphere via exhaust port 130.

During cooling flow, the heater assembly 150 may be deactivated, maintained at a constant pressure, or even "pre-heated" in preparation for a subsequent heating phase. The arrangement of the downstream valve 157 is such that in the second position, a small amount of fluid is allowed to flow through the heater assembly 150 to prevent overheating, but no so much as to have a noticeably detrimental effect of the cooling flow.

The movement of the upstream and downstream heater assembly valves 156, 157 may be passive, in that it is induced by an increased in fluid mass flow rate, and therefore pressure, associated with the transition between heating and cooling flow. This may be achieved e.g. with a resilient flap valve which only opens at a predetermined pressure. Alternatively it may be active, in that the valves are actuated in a known manner.

In an alternate arrangement the heater assembly bypass portion 154 may extend further than the third layer 106, depending upon the specific arrangement of the heater assembly 154 within the in-line air heater 140.

Figure 4:
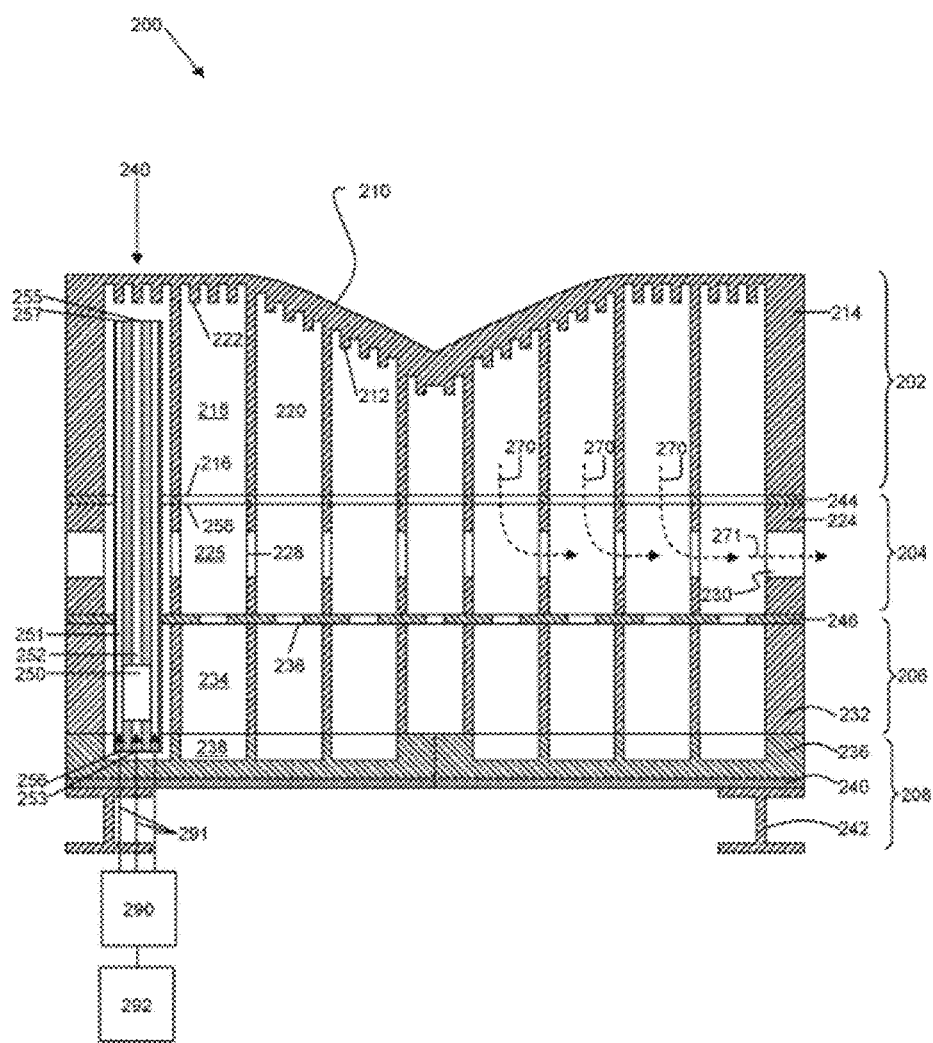
FIG. 4 is a schematic view of a second embodiment of a mould tool heat management system in accordance with the present invention.

Turning to FIG. 4, a similar mould tool 200 to FIG. 3a is shown with like reference numerals designating similar components. The main difference between the tools 100 and 200 is the arrangement of in-line air heater 240. (Again, like in FIG. 3a, only in-line air heater 240 is shown in detail).

The heating fluid flow pathway comprises an in-line air heater 240 having a heater assembly 250, an elongate tube section 252, an inlet 253 and an outlet 255. A cooling fluid flow pathway comprises an elongate tube section 251, an inlet 256 and an outlet 257. The elongate tube section 251 of the cooling fluid flow pathway is concentrically arranged around the elongate tube section 252 of the heating fluid flow pathway and extends for the full height of the in-line air heater 240. The inlets 253, 256 of the heating and cooling fluid flow pathways are supplied (arrows 291) by a compressed air source 290, controlled by a master controller 292, which receives feedback from the tool body 212 via a series of temperature control sensors (not shown).

Like the embodiment of FIG. 3a, the in-line heater assembly 240 of mould tool 200 may be operated in a variety of ways.

When heating of a workpiece is required, the heater assembly 250 is activated and pressurised fluid is urged through the inlet 253 of in-line air heater 240. The heated fluid flows up the elongate tube section 252, and exits the in-line air heater 240 at outlet 255 to impinge upon the rib 222 of the temperature control surface 212.

When cooling of a workpiece is required, the flow of pressurised fluid takes an alternate path along cooling fluid flow pathway, as it is urged through inlet 256, along elongate tube section 251 and exits the cooling fluid pathway at outlet 255 to impinge upon the temperature control surface 212. Following impingement of the cooling fluid on the temperature control surface 212 of the first layer 202, the cooling fluid follows the same path and the heated fluid, i.e. eventually exhausting to the surrounding atmosphere via exhaust port 230.

During cooling flow, the heater assembly 250 may be deactivated, operated with a reduced flow, or even activated in preparation for "hot starting" a subsequent heating phase.

Hot starting is performed as follows:

As shown in FIG. 1, following a period of heating, from times 0 seconds to 65 seconds, the workpiece is cooled for 35 seconds, before a 5 second period is required to remove the treated workpiece and replace it with the next workpiece to be treated. The next workpiece is then heated. As such there is a period of merely 40 seconds in which the workpiece is not being heated. As the cooling flow path bypasses the heater assembly, it is possible, when transitioning from heating to cooling, to stop or slow the heating fluid flow, stop or reduce the power to the in-line heater and thereby retain a level of thermal energy in the heater assembly. When heating of the next workpiece is required, the fluid flow may be recommenced through the still hot heater assembly to provide heating fluid flow almost immediately to the mould tool surface.

Following a period of cooling flow, the heater assembly 250 may be "pre-heated" in preparation for a subsequent heating phase.

Figure 2A:
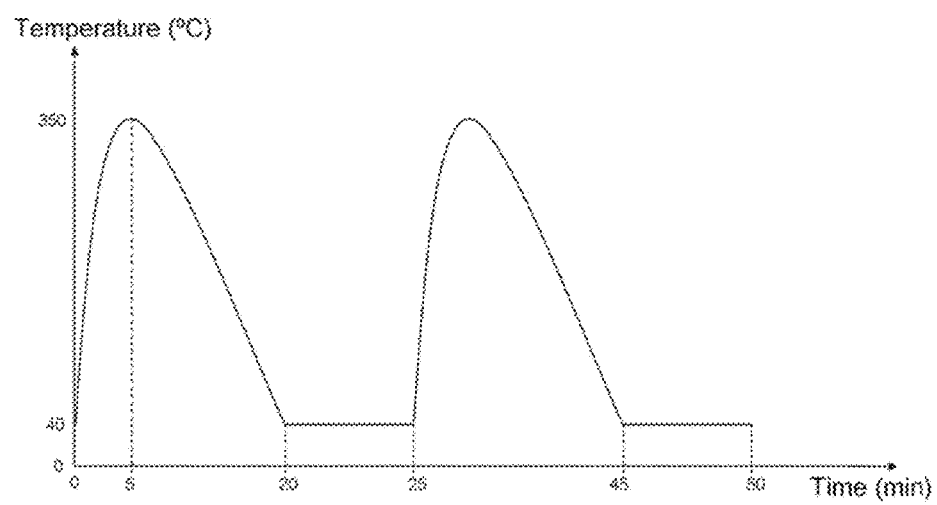
FIG. 2a is a temperature profile of a known layered mould tool used for low volume intermittent production.

Pre-heating is performed as follows:

Recall the "down time" period between removal of a first workpiece after treatment and the beginning of the treatment of the next workpiece, commonly associated with the low volume intermittent production use of a mould tool and shown at times 20 to 25 min and 45 to 50 min of FIG. 2a.

Figure 2B:
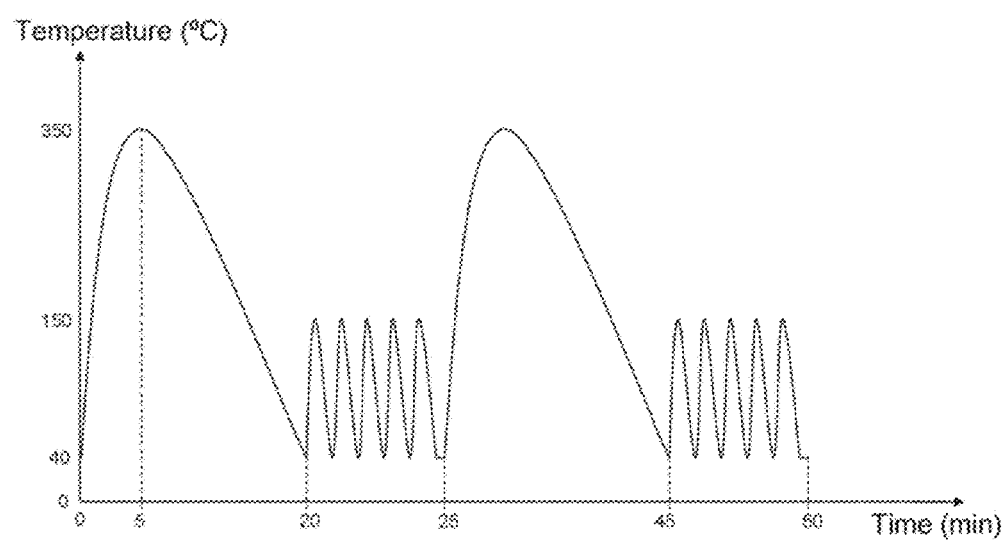
FIG. 2b is the temperature profile of the known layered mould tool of FIG. 2a, operated using a pre-heat charge cycle.

As shown in FIG. 2b, during this down time the in-line heaters of the mould tool are cycled through five short bursts of heating, up to approximately 50% of the maximum tool temperature. This has the effect of "charging" the in-line heater, heater assembly and surrounding tool structure with thermal energy, such that when heating of the workpiece is demanded, there is less thermal inertia within the mould tool to prevent rapid heating of the tool surface.

The number of cycles is not limited to five, and may be any number as desired, nor is the temperature of the cycles limited to 50% of the maximum tool temperature. This process may also be used when preparing the mould tool for first use, for example for the first use of the day following a night of inactivity.

Therefore pre-heating has the effect of ensuring that the in-line heater, and surrounding tool body react as if they had just finished a cycle, ready for the next one.

During cooling flow, fluid flow through the heater assembly 250 may be run backwards, so that heat can be drawn away from the first layer 202 as the cooling flow is initiated via cooling fluid flow pathway 251.

Figure 5:
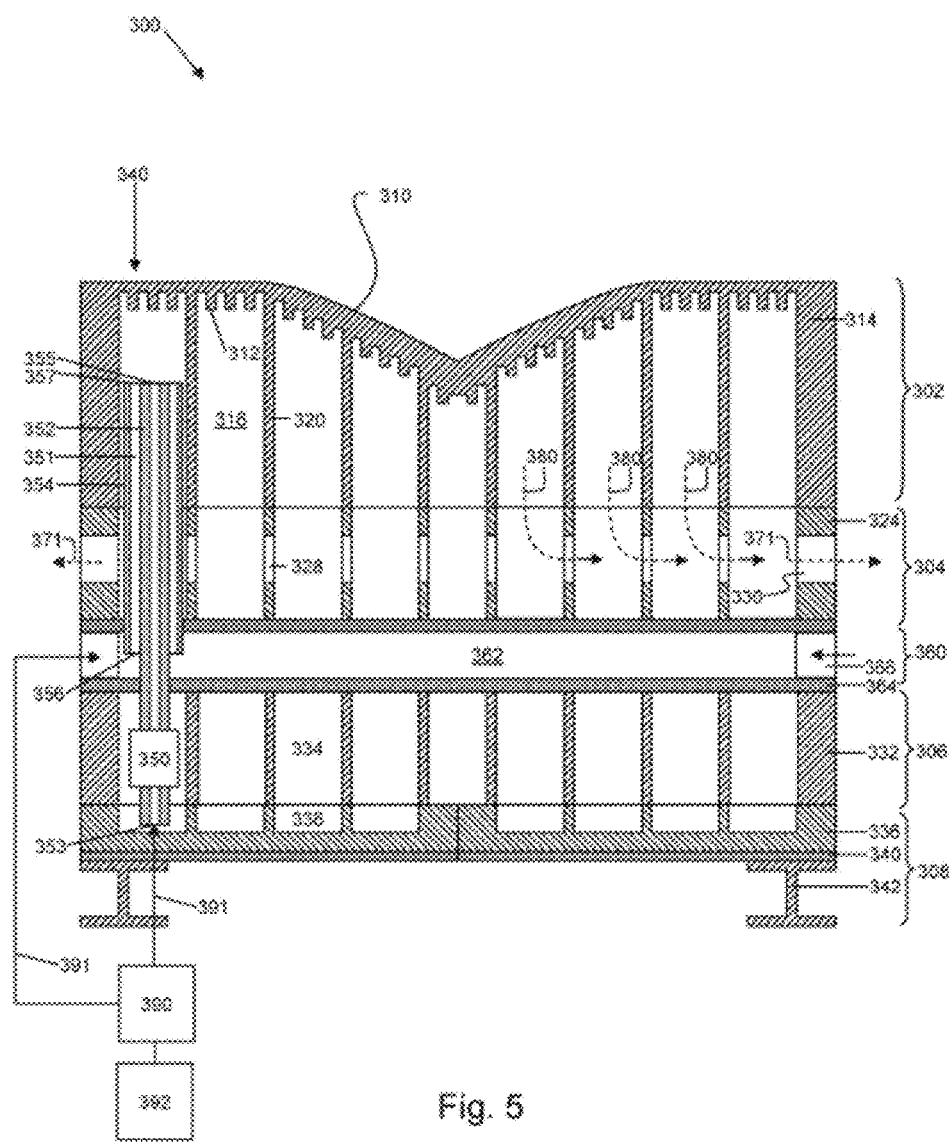
FIG. 5 is a schematic view of a third embodiment of a mould tool heat management system in accordance with the present invention.

Turning to FIG. 5, a similar mould tool 300 to FIGS. 3 and 4 is shown with like reference numerals designating similar components. The main difference between the tools 100, 200 and 300 is the arrangement of the cooling fluid flow pathway and the provision of intermediate layer 360.

Intermediate layer 360 is provided intermediate the second and third layers 304,306 and comprises a body 364 defining a single fluid chamber 362, in fluid communication with ports 366.

As in mould tool 200, heating fluid flow pathway comprises in-line air heater 340 having heater assembly 350, elongate tube section 352, inlet 353 and outlet 355. Cooling fluid flow pathway, comprises elongate tube section 351, inlet 356 and outlet 357. Elongate tube section 351 of the cooling fluid flow pathway is concentrically arranged around elongate tube section 352 and extends from the intermediate layer 306 to the outlet 355 of the elongate tube section 352 of the heating fluid flow pathway, with inlet 356 of the cooling fluid pathway arranged in intermediate layer 306 and outlet 357 of the cooling fluid pathway arranged adjacent the outlet 355 of the heating fluid flow pathway. As such the first layer 302 and the intermediate layer 360 are in fluid communication via the cooling fluid flow pathway. The inlets 353, 356 of the heating and cooling fluid pathways are supplied (arrows 391) by compressed air source 390, controlled by master controller 392.

When heating of a workpiece is required, in-line air heater assembly 340 is operated in the usual way. If very rapid cooling is required, a "cool air blast" may be delivered from the intermediate layer 360 via cooling fluid flow pathway 351.

A slight positive pressure may be required within the intermediate layer 360 to avoid heating thereof. Alternatively, or additionally, refrigeration means may be placed in fluid communication with the intermediate layer 360 to maintain a reservoir of cooling fluid.

Turning to FIG. 6a, a similar mould tool 400 to FIG. 5 is shown with like reference numerals designating similar components. The main difference between the tool 400 and 300 is that the exhaust layer and intermediate layer have been combined to form a combined layer 404. This fully integrated cool air blast layer is made possible by the castellated formation of the combined layer 404, which affords simultaneous supply of pressurised cooling fluid from compressed air source 490 via channel 491 to inlet 456 of the cooling fluid flow pathway on one side of the combined layer 404 and exhaust of fluid following impingement on the temperature control surface 412 through exhaust port 430 on the other side of the combined layer 404.

Furthermore, the cooling fluid flow path is provided by multiple elongate tube sections 451, isolated from the heating fluid flow path, which is provided within elongate tube member 452.

FIGS. 6b, 6c and 6d show the alternate configurations for the provision of the heating and cooling flow paths.

In the embodiment of FIG. 6b, two cooling fluid flow pathways are provided per inline air heater assembly 420, by two elongate tube sections 451 arranged about the elongate tube member.

In the embodiment of FIG. 6c, four cooling fluid flow pathways are provided per inline air heater assembly 440 by four elongate tube sections 551 arranged about the elongate tube member 552 of the heating fluid flow pathway. In the alternate embodiment of FIG. 6d, the four elongate tube sections 651 are provided on bosses formed in the chamber walls 620 and peripheral wall 614.

It will be appreciated that although the invention has been described in relation to a single tool face in many applications a tool with two faces will be used and that an upper tool face according to this invention may also be used in combination with a lower tool face to provide active heating and cooling from both sides of the tool.

Variations fall within the scope of the present invention. Other flow pathway configurations including bypassing of the in-line air heater are possible using the present invention.

As well as air heating and cooling, other fluids may be used for temperature control, such as liquids.

The invention claimed is:

1. A tool system for moulding an article, the system comprising:
    a tool having:
        a mould layer defining a tool surface for forming an article, and a temperature control surface opposite the tool surface, the temperature control surface at least partially bounding a plurality of fluid chambers, the mould layer comprising a plurality of tool zones corresponding to the plurality of fluid chambers;
        a further layer supporting the mould layer in use; and
        an intermediate layer positioned between the mould layer and the further layer;
    a heating assembly comprising an in-line heater for heating fluid passing through a respective heating fluid flow path, each heating fluid flow path being defined by a conduit with an inlet located in the further layer and an outlet located in a respective one of the plurality of fluid chambers; and
    a cooling assembly comprising a cooling fluid flow path, each cooling fluid flow path being defined by a conduit with an inlet located in the intermediate layer and an outlet located in a respective one of the plurality of fluid chambers.

2. A tool system for moulding an article according to claim 1, wherein the heating and cooling fluid flow paths are isolated from one another.

3. A tool system for moulding an article according to claim 1, wherein the intermediate layer is in fluid communication with refrigeration assembly.

4. A tool system for moulding an article according to claim 1, wherein the cooling fluid flow path is concentrically arranged about the heating fluid flow path.

5. A tool system for moulding an article according to claim 1, having a control assembly adapted to control the heating assembly and the cooling assembly.

6. A tool system for moulding an article according to claim 5, wherein the control assembly is configured to individually heat or cool the tool zones by selectively directing fluid flow via the heating and/or cooling fluid flow paths.

7. A tool system for moulding an article according to claim 6, wherein the control assembly is configured to individually heat or cool the tool zones by varying the fluid flow rate to at least one of the heating and cooling flow paths.

8. A tool system for moulding an article according to claim 1, comprising a plurality of heating assemblies and a plurality of cooling assemblies,
wherein the in-line heaters of each of the plurality of heating assemblies are independently controllable.

9. A tool system for moulding an article according to claim 8,
wherein the intermediate layer comprises a common fluid chamber and wherein the conduits of each of the plurality of cooling assemblies are fed by the common fluid chamber.

10. A tool system for moulding an article according to claim 1,
wherein the conduit of the heating assembly passes through the intermediate layer.

11. A method of manufacturing an article comprising the steps of:
providing a tool system for moulding an article, the tool system comprising:
a tool having:
a mould layer defining a tool surface for forming an article, and a temperature control surface opposite the tool surface, the temperature control surface at least partially bounding a plurality of fluid chambers, the mould layer comprising a plurality of tool zones corresponding to the plurality of fluid chambers;
a further layer supporting the mould layer in use; and
an intermediate layer positioned between the mould layer and the further layer; and
a heating assembly comprising an in-line heater for heating fluid passing through a respective heating fluid flow path, each heating fluid flow path being defined by a conduit with an inlet located in the further layer and an outlet located in a respective one the plurality of fluid chambers; and
a cooling assembly comprising a cooling fluid flow path, each cooling fluid flow path being defined by a conduit with an inlet located in the intermediate layer and an outlet located in a respective one of the plurality of fluid chambers;
placing an article to be moulded on the tool surface;
heating the article by activating the heating assembly to increase the tool surface temperature; and
cooling the article by activating the cooling assembly to decrease the tool surface temperature.

12. A method according to claim 11 comprising the further step of:
actively controlling the heating assembly and the cooling assembly to regulate the heat transfer into and out of the article at each tool zone at any particular time throughout the moulding process by selectively directing fluid flow via the heating and/or cooling fluid flow paths.

13. A method according to claim 11, further comprising activating the heating assembly to increase the temperature of the tool surface before the step of placing an article to be moulded on the tool surface.

14. A method according to claim 11, further comprising keeping the in-line heater of the heating assembly activated during the step of cooling the mould surface with the cooling assembly, such that the heating assembly is pre-heated ready for a subsequent transition from cooling to heating.

15. A method according to claim 14, further comprising keeping the in-line heater of the heating assembly activated at a reduced level during the step of cooling the mould surface with the cooling assembly.

16. A method according to claim 11, further comprising reversing the fluid flow through the in-line air heater when transitioning between the steps of heating the article and cooling the article.

17. A method according to claim 11, further comprising:
removing the article to be moulded from the tool surface subsequent to the step of cooling the article;
placing a further article to be moulded on the tool surface;
heating the further article by activating the heating assembly to increase the tool surface temperature; and
cooling the further article by activating the cooling assembly to decrease the tool surface temperature.

* * * * *